United States Patent [19]

Duncan et al.

[11] Patent Number: 4,978,058

[45] Date of Patent: Dec. 18, 1990

[54] FLOW CONTROL SYSTEMS AND/OR LAUNDRY MACHINES INCLUDING SUCH FLOW CONTROL SYSTEMS

[75] Inventors: Gerald Duncan; Frank W. Shacklock; Murray Greenman, all of Auckland, New Zealand

[73] Assignee: Fisher & Paykel Limited, Auckland, New Zealand

[21] Appl. No.: 307,275

[22] Filed: Feb. 7, 1989

[30] Foreign Application Priority Data

Feb. 9, 1988 [NZ] New Zealand .................. 223460

[51] Int. Cl.⁵ .......................................... G05D 23/13
[52] U.S. Cl. .............................. 236/12.12; 236/12.14; 251/129.08
[58] Field of Search ............... 236/12.1, 12.11, 12.12, 236/12.14; 137/606, 624.2; 251/129.08

[56] References Cited

U.S. PATENT DOCUMENTS

| | | | |
|---|---|---|---|
| 3,383,037 | 5/1968 | Vince | 236/12.12 |
| 3,434,488 | 3/1969 | Talbot | 236/12.12 |
| 4,330,081 | 5/1982 | McMillan | 236/12.1 |
| 4,541,562 | 9/1985 | Zukausky | 236/12.12 |
| 4,714,089 | 12/1987 | Ueda et al. | 251/129.08 X |

FOREIGN PATENT DOCUMENTS 0742585 12/1955 United Kingdom ............. 236/12.12

Primary Examiner—Harry B. Tanner
Attorney, Agent, or Firm—Fleit, Jacobson, Cohn, Price, Holman & Stern

[57] ABSTRACT

A specific physical characteristic (temperature) of a mixture of two liquids in a mixing chamber (14) is controlled by progressively opening a valve member (35) of a selected valve (10,11) through which one of the liquids flows while the other liquid flows through the other valve, and if the temperature of the mixed liquids has not reached a desired level, the selected valve is left fully open while the other valve is progressively closed to adjust the temperature to that desired. The opening and closing of the valves is controlled in response to signals from a sensor in the mixing chamber.

11 Claims, 3 Drawing Sheets

FLOW CONTROL SYSTEMS AND/OR LAUNDRY MACHINES INCLUDING SUCH FLOW CONTROL SYSTEMS

BACKGROUND OF THE INVENTION

This invention relates to flow control systems and/or methods of controlling flows and/or equipment including such flow control systems and has been devised particularly though not solely for use in controlling the supply of attemperated water to laundry machines.

The traditional method of providing warm fill water in laundry machines is to pulse a cold water valve on for a given proportion of the fill time. Since the cold flow rate is generally higher than the hot flow rate due to higher cold water pressure, this system works satisfactorily in most domestic situations. It does not, however, provide accurate control since the mix temperature will fluctuate with varying hot pressure, cold pressure, hot temperature and cold temperature. All these can vary from fill to fill to some extent, and from one environment to another to a much greater extent. This is why an adjustment knob (for altering the proportion of cold water to hot water) is usually fitted.

Some machines, particularly in the North American environment where high pressure hot water systems are common, have utilized a bimetal operated proportioning valve—this only works if the flow rates of hot and cold are the same. Most North American machines rely on equal flow rates to provide warm fill at 50% mix by simply turning two conventional valves on together.

It has been realized in the last few years that water temperature is an important factor in wash performance: too cold and soil removal suffers (decreased solubility of wash powder); too hot and fabric damage is excessive. 40° celsius is an accepted optimum warm temperature.

Some home environments have very hot water (80°-90° C.) from "wet back" solid fuel heaters and so on. Control of the hot wash temperature is considered desirable to reduce the excessive hot temperature so that plastics in the machine and delicate clothes placed in the machine are not damaged, clothes wear is limited and risk of burns is reduced. An acceptable hot wash temperature seems to be 60° C.

BRIEF SUMMARY OF THE INVENTION

The present invention, in a preferred form, provides a new laundry machine and/or a flow control method and system that can provide reasonably accurate warm and hot fill temperatures substantially without regard to the operating environment.

It is an object of the present invention to provide a control system and/or equipment including such flow control systems and/or a method of controlling flows.

Accordingly in one aspect the invention consists in a method of controlling temperature of a mixture of two liquids supplied to a mixing chamber, each liquid having a different level of temperature and a first one of said having a high temperature level and liquids being caused to flow through a selected first valve and the second one of said liquids having a low temperature level and being caused to flow through a second valve to the mixing chamber, the valves each having a valve seat, a spring loaded valve member spring loaded to a closed position against said valve seat and an electromagnet effective on energization to actuate said spring loaded valve member towards a fully open position and actuable by causing a current to flow through said electromagnet of said selected valve to cause said electromagnet to progressively open the valve member, the method comprising the steps of opening the second valve to desired degree of opening, controlling the current flowing in the electromagnet of the selected first valve in a manner such that the greater the current flowing the greater the flow of liquid through the selected valve, sensing the temperature in the mixing chamber and controlling the current flowing in the electromagnet according to the temperature of the liquid in the mixing chamber in a manner such that the valve member of the selected valve progressively opens or shuts so that temperature of the mixture of two liquids flowing through the first and second valves is maintained at or approaching a desired level in the mixing chamber, and in the event of the first valve being opened to the fully open position and, the desired raised temperature in said mixing chamber has not been reached, progressively closing the second valve to further increase the temperature of liquid in the mixing chamber up to the temperature level of the first liquid if the desired temperature is at or higher than said first liquid temperature level.

In a further aspect the invention consists in a flow control system to control the temperature of a mixture of two liquids, a first liquid having a the temperature level and a second liquid having a low temperature level, the flow control system comprising a first valve through which the first liquid flows and a second valve through which the supplied to a mixing chamber, each of the valves being a proportional control valve having a valve seat, a spring loaded valve member, spring loaded to a closed position against the valve seat and an electromagnet effective on energization to actuate the valve member towards a fully open position, temperature sensing means positioned in the mixing chamber and in use sensing the temperature level of the mixing liquid in the mixing chamber, and first valve control means and second valve control means responsive to the sensing means and, on initiation, to open the second valve to a desired degree of opening, the construction and arrangement being such that in operation with said second valve opened to the desired degree current flowing through the electromagnet of the selected valve is controlled by the first valve control means to desired levels responsive to signals from the temperature sensing means in a manner such that the first selected valve is progressively opened or closed substantially according to current flowing in the electromagnet thereof so that the mixed liquid in the mixing chamber has the temperature thereof maintained at or approaching a desired level and if the desired temperature is not reached with the first valve fully open and the second valve at the desired degree of opening, the second valve is progressively closed to increase the temperature of liquid in the mixing chamber up to the temperature of the first liquid if the desired temperature level in the mixing chamber is at or higher than the first liquid temperature level.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred form of the invention will now be described with reference to the accompanying drawings wherein.

DETAILED DESCRIPTION

Figure 1:
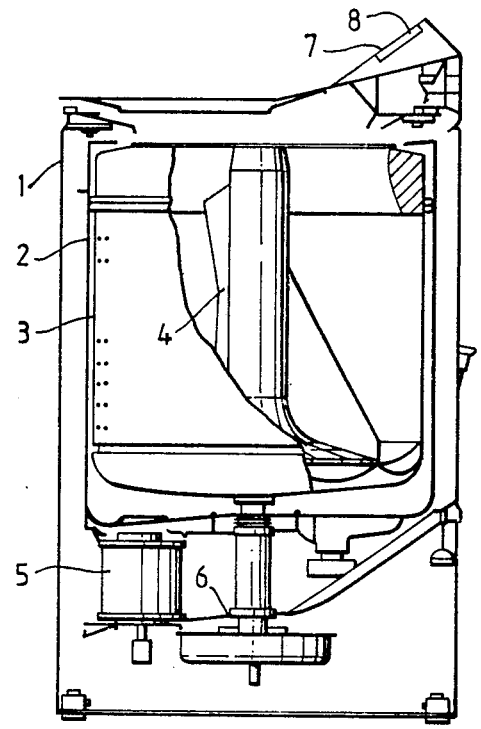
FIG. 1 is an elevational view with parts cut away and in cross section showing a clothes washing machine incorporating the invention.

Referring now to the drawings, there is shown in FIG. 1 a laundry machine 1 having a container 2 in which a spin tub 3 and an agitator 4 are driven by an electric motor 5 through a belt (not shown) and a pulley 6. Such a construction is known. Mounted on the cabinet of the washing machine is a console control panel 7 which contains user control, and includes a microprocessor 8.

Figure 2:
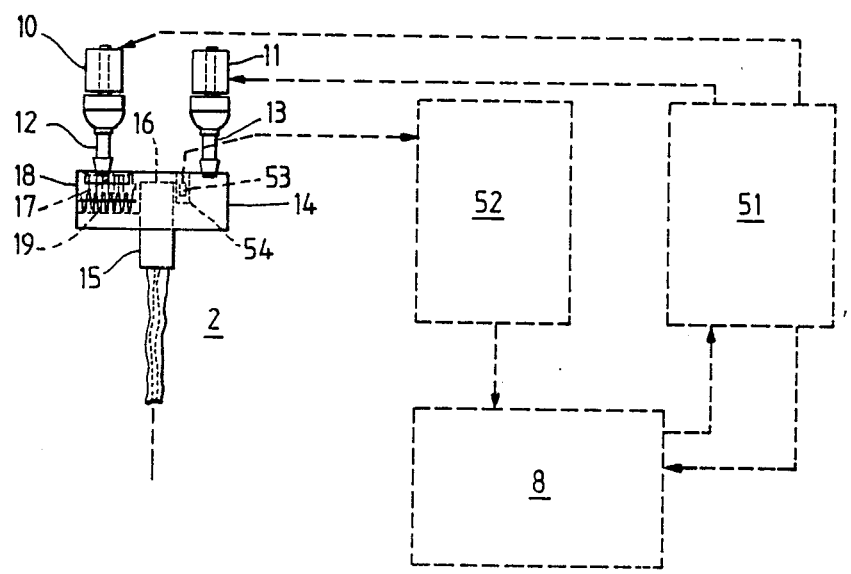
FIG. 2 is a diagramatic drawing showing the arrangements of circuitry and valves forming part of the invention.

Referring now to FIG. 2, two electromagnetic solenoid operated valves are provided, a hot water valve 10 and a cold water valve 11 having inlets from a hot water supply and a cold water supply respectively and the outlets 12 and 13 from the valves lead to a mixing or mixed liquid e.g. water chamber 14. An outlet 15 having a weir type inlet 16 at an upper level of the mixing chamber 14 leads to the container 2 of the laundry machine. Mounted on the upper surface 17 of the chamber 14 is an assembly of electronic devices which heat up in use and such devices may comprise power switches such as I.G.T.'s, a high voltage IC rectifier and other control devices which in normal use are associated with an air cooled heat sink to dissipate heat which the devices generate in use. The chamber 14 is mounted in a container 18, the devices being embedded in a heat transfer material, e.g. an epoxy resin, and the container 18 is fixed to the surface 17 e.g. by and an epoxy adhesive or by mechanical fixing including a heat transfer coating such as a heat transferring gel. The surface 19 of the container 18 is arranged to be below the level of the weir inlet 16 and is preferably corrugated as shown to give and enlarged surface area exposed to water in the mixing chamber 14. The surface 19 is also preferably exposed to cold water flow from valve 11 before material mixing occurs.

Figure 3:
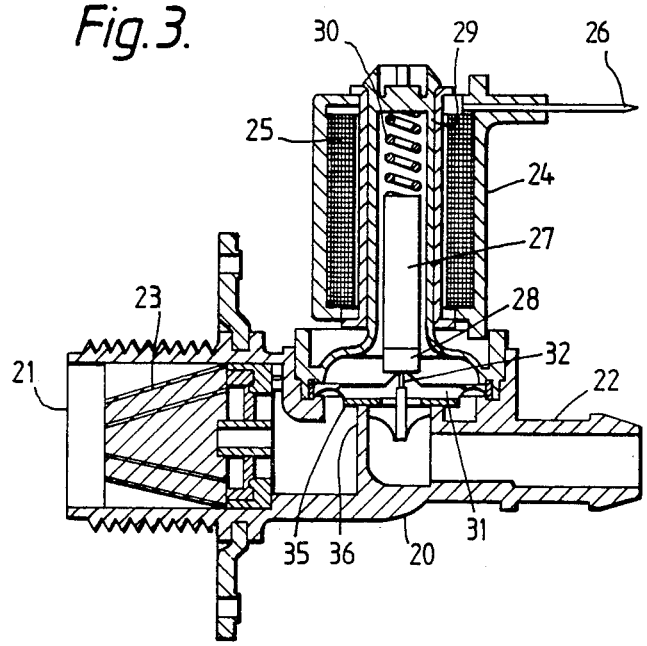
FIGS. 3 and 4 are cross-sectional views of the actual physical arrangements of valves and a mixing chamber forming part of the invention.

One of the valves 10 and 11, e.g. the hot water valve 10, may be of the known form shown in FIG. 3 comprising a body 20 having an inlet 21 and outlet 22, there being a filter 23 in the inlet 21. An electromagnet 24 has a solenoid coil 25 with a connection tab 26 and an armature or valve member 27 having a flexible seal 28 and running in an armature guide 29 being moved to a closed disposition by a spring 30. The rate of spring 30 is about 10 N/m. The valve has a diaphragm 31 with a bleed hole 32 therein normally closed by the armature seal 28, but on energizing the coil 25 the seal is raised and the valve then admits water over the valve member seal 35 and the valve seat 36.

Figure 4:
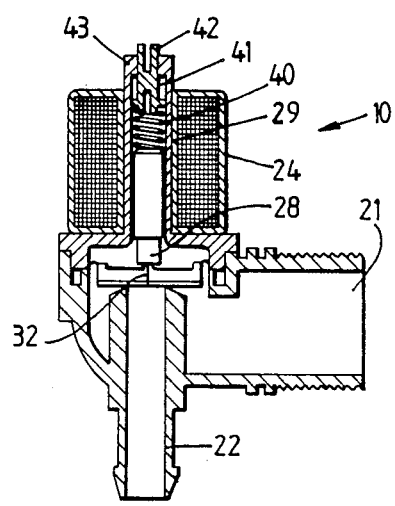

The other valve, i.e. the cold water valve 11 and preferably both valves, may be modified to provide proportional opening in accordance with FIG. 4 where in place of the spring 30 of FIG. 3 which as stated above normally has a rate of about 10 N/m, a spring 40 is provided having a rate of about 1000 N/m. Additionally an abutment 41 for the spring 40 may be provided as a screw adjustable abutment having a screw thread 42 engageable with a corresponding part 43 of the armature guide 29.

Some details of diaphragm 32 and the seat may be changed to provide progressive operation of the valve.

As referred to above preferrably both valves 10 and 11 provide proportional opening and for example ELBI 12 volt DC proportional valve type NZ-068-LB88 may be used. These valves are generally of the construction shown in FIG. 4.

The control system for controlling the valves 10 and 11 comprises broadly a microprocessor (FIG. 2), being part of the microprocessor 8 of FIG. 1 proportional valve driver circuits 51, and a specified physical characteristic sensing circuit comprising in the preferred form, a temperature sensing circuit 52. The temperature sensing circuit is supplied with temperature signals from a thermistor 53 (FIG. 2) provided in a recess 54 which is below the level of the weir entry 16 to the outlet 15.

Figure 5:
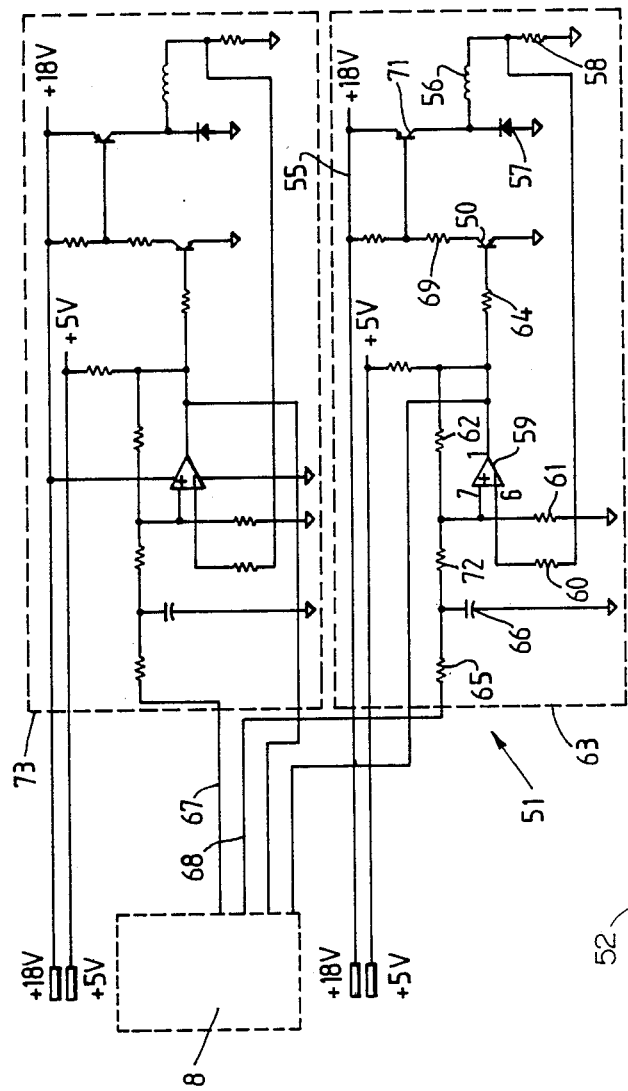
FIG. 5 is a detailed circuit diagram of valve drive electronic equipment forming part of the invention.

Referring now to FIG. 5, the valve driver circuits 51 are shown in outline boxes referenced 63 and 73 shown associated with the console microprocessor 8. Each valve driver circuit 63 and 73 is self oscillating and operates as follows. Only the valve driver circuit 63 will be described in detail, the circuit 73 being of similar construction and operation. A transistor 50 is turned on by an electronic device 59, which acts as a comparator, through resistance causing at least 30 MA to flow in resistor 69, most of which is base current in transistor 71. Transistor 71 saturates, causing increased current to flow from the +18 V supply through the coil 56 of say the hot water valve 10 causing operation of that valve as will be described further below. When the device 59 and the transistors 50 and 71 are turned off as a result of the self oscillation of the circuit inductive current continues to flow in the coil 56 through the diode 57. At all times the current in the coil 56 can be sensed at shunt resistor 58.

As stated above device 59 acts as a comparator sensing the coil current from the shunt resistor 58 through resistor 60. Hysteresis is provided by resistors 61 and 62. The circuit oscillates with a period relating to the coil inductance and the hysteresis values. The average coil current is maintained at a sufficient level that the average voltages at the comparator inputs are the same. When the demand voltage through resistor is altered the average current level alters to suit. This is achieved by varying the duty cycle of the oscillator.

Demand voltages for the oscillator are derived for example from a PWM output from the microprocessor 8, at a frequency of for example between 1 KHZ–5 KHZ, the frequency not being critical. The output is integrated to a DC voltage by resistance 65 and capacitor 66. This circuit acts as a digital to analog convertor with 8 bit resolution. The 2 valve PWM outputs (2 valves and beeper) are interrupt driven from a timer, and are standard totem pole outputs. Only one PWM circuit at a time is operated in pulse width modulation mode. The outputs from the driver circuits 63 and 73 to the solenoids of the valves 10 and 11 are arranged so that static off (0 V) provides off mode and, static on (5

V) provides full on mode. The circuit gain is such that +5 V gives 66% duty cycle equivalent to 12 volt DC operation. This relieves the microcomputer 8 from having to control both valves at once and also assists in preventing valve damage.

Figure 6:
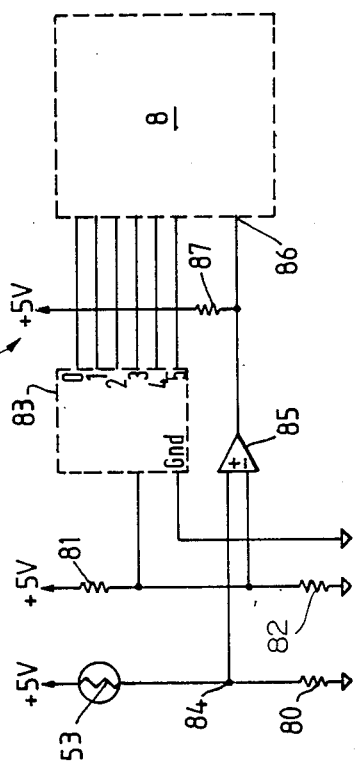
FIG. 6 is a circuit diagram of temperature sensing electronic elements forming part of the invention.

Referring to FIG. 6 the temperature sensing circuit and apparatus is therein shown. Thus the temperature sensitive device (silicon sensor or thermistor) 53 which is mounted in the mixing chamber as shown in FIG. 2, operates in association with resistors 80, 81, 82 and a 6 bit R-2R network 83. These resistors and network have a current summing point at their common junction. Resistances 81 and 82 serve to set the average DC output at the junction and the effective gain of the digital to analog convertor formed by resistance 83 (the R-2R network) and the microprocessor 8. The gain provided is such that the range of the 6 bit D-A convertor just exceeds the operating temperature range. It provides one degree C resolution over the range 10 to 73 degrees in the example being described.

The microprocessor operates the A to D operation by the successive approximation method where it attempts one bit at a time (high order first) to match the D to A output voltage to the voltage at the junction 84 of R101 and R103. The six microprocessor outputs to the R-2R network 83 control the network as described above. The device 85 which acts as a comparator is used to sense whether the A to D output exceeds the thermistor voltage or not. Its inputs are to the junction 84 and the junction between resistances 81, 82 and the R-R2network 83.

The output of comparator 85 goes to a microprocessor input 86 and requires a pullup resistor 87 since the comparator output is open collector.

At the end of the successive approximation temperature sensing cycles the microprocessor stores the 6 bit value it has arrived at as the current temperature, referred to below as the CURRENT TEMPERATURE word.

The operation of the apparatus above described is as follows. The microprocessor 8 provides a variable DC voltage by software pulse width modulation techniques. The DC voltage is filtered and applied to the valve driver circuits of FIG. 5. When the microprocessor output is low (OV) the oscillator still runs but with the duty cycle so low that the valve controlled by the particular valve drive circuit 63 or 73 does not operate. When the output is high the oscillator duty cycle is about 66% so that the particular valve 10 or 11 is fully on. At 66% duty cycle the coil current is about the same as DC operation on 12 volts (the valve solenoids are fitted with 12 volt DC coils in the particular example being described). It is to be noted that the valve solenoids are driven with DC current to enable the inductance to be sensed. The driver circuits self oscillate as above described and the period of oscillation depends on the hysteresis threshold of the comparator and on the inductance of the coil at any particular instant. It is of course recognized that the inductance of the coils of the valves 10 and 11 will vary according to the position of the armature of the valves which will vary according to the current supplied to the coils. Thus the period of oscillation varies from 0.3 to 4.4 milliseconds for particular parameters and this period is sensed by the microprocessor 8. The duty cycle of oscillation depends on the output voltage provided by the microprocessor.

The two valve circuits as stated are identical and the physical arrangement of the water system is such that correct operation is possible with the hot water supplied to either one of the two valves. The software can test which valve is which so flexible foolproof operation is possible. At any time during filling, one valve is preferably left fully on which maximizes the fill rate while the other valve is proportionally controlled. This means that the microprocessor only needs to pulse width modulate one output at a time.

It should be mentioned that the console microprocessor 8 handles a number of tasks in relation to the washing process but the filling operation and temperature control are treated in isolation since they operate independantly due to the nature of an interrupt control provided in the console microprocessor.

In setting the temperature, the valve control task is given a number which equates to the demanded full temperature (the DEMAND word). This temperature can be anywhere within the six bit range, 10° to 73° C. Presuming that the microprocessor knows by now which valve supplies hot water (as stated above either valve can be selected and identified by the apparatus collating the change in temperature indicated by the thermistor 53 as compared with the demand fill temperature). The first operation of the apparatus is to turn the cold water valve fully on. The duty cycle of the hot valve is slowly increased as will be described further later until a point is reached when the CURRENT TEMPERATURE word equals the DEMAND word. In this regard temperature sensing is effected by successive approximations to arrive at an output 6 bit word to the D-A convertor, (R-2R network) which aprroximation is the closest to the current temperature dependant voltage at the thermoster 53. This word is stored for use by the valve control algorithm and is the CURRENT TEMPERATURE word above referred to. When the CURRENT TEMPERATURE word equals the DEMAND word then that is an equilibrium point but if the CURRENT TEMPERATURE word does not equal the DEMAND word when the hot water valve is fully, on the hot water is left fully on and the cold water valve duty cycle is slowly reduced in the preferred form of the invention when both valves are proportional valves until the CURRENT TEMPERATURE word and the DEMAND word are equal, in other words the current temperature corresponds to the demanded fill temperature. At this point the fill continues with corrections taking place at regular intervals due to fluctuation in the water temperatures or pressures or flow ways. By maintaining one valve fully on maximum fill rate is achieved. If the hot water temperature available does not meet the demanded fill temperature, the cold water valve remains closed and if desired a circuit is provided to indicate a cold washing condition.

The ramping up and down of valve duty cycle demand (call it VALVE DEMAND) is done using an integrating technique. The CURRENT TEMPERATURE is subtracted from the DEMAND word at fixed intervals about once per second. The result is positive if the CURRENT TEMPERATURE is low and negative if the CURRENT TEMPERATURE is high. Each time this calculation is made a correction is made to the demand output of the control valve as follows:

| Subtraction result | Hot valve controlled | Cold valve controlled |
|---|---|---|
| positive | VALVE DEMAND increased | VALVE DEMAND decreased |
| negative | VALVE DEMAND | VALVE DEMAND |

| -continued |  |
| --- | --- |
| decreased | increased |

When a steady state is reached the demand is incremented and decremented slightly e.g. by one step on alternate control cycles thus retaining the required average demand. By restricting the sensing cycle rate, good stability of the control loop is achieved (the thermistor response time is of the order of seconds).

Since the temperature control loop response time is long, the loop cannot correct for short term variations in temperatures caused particularly by changes in water supply pressures. For this reason a second fast control loop may be added which operates as follows. An external input from the proportionally controlled valve driver 63 or 73 to the microprocessor 8 causes a regular interrupt which the microprocessor uses to measure the oscillation period of the driver. This period is dependent on the displacement of the armature in the electromagnet. At intervals between e.g. 0.3 and 4.4 ms the microprocessor will know of any displacement error in the valve armature as a change in period reading. If the period is reduced it means that the armature has moved out of the solenoid in the direction that reduces the flow.

At the start of each temperature control cycle (about once per second) the current driver period is stored call it "PERIOD REFERENCE". At every interrupt from the valve driver the measured period (CURRENT PERIOD) is compared with the PERIOD REFERENCE by subtraction. The difference is multiplied by a scaling factor and added to or subtracted from the current VALUE DEMAND. This loop is much faster (250 to 3,000 times per second) and easily stabilizes small armature movements. Note that the result (call it VALVE OUTPUT) is sent to the PWM D-A converter routine in the microprocessor but is not used for subsequent corrections. At all times the inductive current control loop works with VALVE DEMAND. Inductive control is preferably only used below about 30% duty cycle where the effective pressure changes are most marked i.e. at low flow rates. As it happens, this is also where the change of inductance with armature displacement is most sensitive. Because inductive control only occurs at lower demand duty cycles, there is never any need to inductively control two valves at once. The decision as to which period sense input to use depends only on which valve is not at 100% PWM.

To provide the microprocessor with an analog output, an 8 bit up counting timer is used to produce pulse width modulated output, which is integrated on an external capacitor to a DC voltage. The timer is used to provide an internal interrupt when it overflows to zero. At every alternate interrupt, the timer is loaded with VALVE OUTPUT, and alternately with the complement of VALVE OUTPUT. When VALVE OUTPUT is loaded into the timer, the PWM output pin is set low; when the complement is loaded, the PWM output pin is also complemented. Thus the timer produces a square wave output on the pin with a period equal to 256 times the timer clock and a duty cycle related to VALVE OUTPUT.

Although a digital to analog converter and comparator temperature sensing circuit has been described, a multiple slope ramp circuit or other technique may be used. The invention in the preferred form provides reasonably accurate control of the temperature of water used to fill the water container of a laundry machine thus overcoming at least some of the disadvantages of current filling methods and systems.

The invention is applicable to apparatus in which a mixture of two or more fluids having different physical characteristics is required. Such apparatus for example comprises refrigerators, freezers, dish washers and air conditioners and the different physical characteristics may comprise for example colors optical density and specific gravity.

We claim:

1. A method of controlling temperature of a mixture of two liquids supplied to a mixing chamber, each liquid having a different temperature level and a first one of said liquids having the higher temperature level being caused to flow through a selected first valve and the second one of said liquids being caused to flow through a second valve to said mixing chamber, each of said valves having a valve seat, a spring loaded valve member spring loaded to a closed position against said valve seat and an electromagnet effective on energization to actuate said spring loaded valve member towards a fully open position and actuable by causing a current to flow through said electromagnet to cause said electromagnet to progressively open said valve member, said method comprising:

opening said second valve to a desired degree of opening;

controlling the current flowing in said electromagnet of said selected first valve in a manner so that the greater the current flowing the greater the flow of liquid through said selected first valve;

sensing the temperature in said mixing chamber and controlling the current flowing in said electromagnet of said selected first valve according to said temperature of the liquid in said mixing chamber in a manner such that said valve member of said selected first valve progressively opens or closes so that the temperature of said mixture of said two liquids flowing through said first and second valves is maintained equal to or approaching a desired level in said mixing chamber, and when said first valve is opened to the fully open position and the desired raised temperature in said mixing chamber has not been reached, progressively closing said second valve to further increase the temperature of liquid in said mixing chamber up to the temperature level of said first liquid when said desired temperature is equal to or higher than said first liquid temperature level.

2. A flow control system to control the temperature of a mixture of two liquids, a first liquid having a high temperature level and a second liquid having a low temperature level comprising:

a mixing chamber;

a first valve through which said first liquid flows to said mixing chamber;

a second valve through which said second liquid flows to said mixing chamber;

each of said valves being a proportional control valve comprising a valve seat, a spring loaded valve member spring loaded to a closed position against said valve seat, and an electromagnet means effective on energization to actuate said valve member towards a fully open position;

temperature sensing means positioned in said mixing chamber for sensing the temperature level of the mixing liquid in said mixing chamber;

second valve control means responsive to said sensing means to open on actuation thereof said second valve to a desired degree of opening; and first valve control means responsive to said sensing means, so that in operation with said second valve opened to said desired degree, current flowing through said electromagnet means of said first valve is controlled by said first valve control means to desired levels responsive to signals from said sensing means in a manner such that said first valve is progressively opened or closed substantially according to current flowing in said electromagnet means thereof so that the temperature of mixed liquid in said mixing chamber is maintained equal to or approaching a desired temperature level, and when said desired temperature level is not reached with said first valve fully open and said second valve at said desired degree of opening, said second valve is progressively closed to increase the temperature of liquid in said mixing chamber up to the temperature of said first liquid when the desired temperature level in said mixing chamber is equal to or higher than said first liquid temperature level.

3. A flow control system as claimed in claim 2 wherein said temperature sensing means comprises a thermistor mounted in said mixing chamber.

4. A flow control system as claimed in claim 3 wherein:
a microprocessor is provided operatively connected to said temperature sensing means for acting in response to signals therefrom; and
the electromagnet means of each valve comprises a solenoid coil and a valve driving circuit, each valve driving circuit being connected to said microprocessor for receiving commands from said microprocessor for proportionally controlling the degree of opening of the valve controlled by the respective valve driving circuit.

5. Apparatus comprising a flow control system as claimed in claim 4 and a container, said container receiving mixed liquids from said flow control system.

6. Apparatus comprising a flow control system as claimed in claim 3 and a container, said container receiving mixed liquids from said flow control system.

7. A flow control system as claimed in claim 2 wherein:
a microprocessor is provided operatively connected to said temperature sensing means for acting in response to signals therefrom; and
the electromagnet means of each valve comprises a solenoid coil and a valve driving circuit, each valve driving circuit being connected to said microprocessor for receiving commands from said microprocessor for proportionally controlling the degree of opening of the valve controlled by the respective valve driving circuit.

8. Apparatus comprising a flow control system as claimed in claim 7 and a container, said container receiving mixed liquids from said flow control system.

9. A flow control system as claimed in claim 7 wherein said valve driving circuits and said microprocessor are arranged so that proportional control of only one of said valves is effected at any one time.

10. Apparatus comprising a flow control system as claimed in claim 9 and a container, said container receiving mixed liquids from said flow control system.

11. Apparatus comprising a flow control system as claimed in claim 2 and a container, said container receiving mixed liquids from said flow control system.

* * * * *